Patented Mar. 26, 1940

2,194,613

UNITED STATES PATENT OFFICE 2,194,613

PROCESS FOR MAKING POLYVINYL ACETAL RESINS

Granville A. Perkins, Charleston, W. Va., assignor, by mesne assignments, to Union Carbide and Carbon Corporation, a corporation of New York No Drawing. Application December 14, 1935, Serial No. 54,397

6 Claims. (Cl. 260—73)

This invention is a process for making artificial resin-like substances useful for forming plastic and similar compositions. Specifically, the process provides an improved method comprising a single reaction step for producing products which may be characterized as partial polyvinyl acetal resins directly from polymerized vinyl esters.

Polyvinyl acetals are resinous substances in which aldehydes are combined with polymeric vinyl alcohol. These substances are exactly analogous to the alkylidene diethers, or acetals, formed when two molecules of a simple alcohol combine with one molecule of an aldehyde, and from this analogy the identifying term, polyvinyl acetal, is obtained. As in the case of the simple alcohols, polyvinyl alcohol combines with aldehydes in the proportion of two molecular equivalents of its theoretical monomer, vinyl alcohol, to each molecular equivalent of aldehyde.

It may be assumed, on the basis of such knowledge as is available of complex organic molecules, that polyvinyl alcohol contains in each macromolecule a number of alcoholic hydroxyl groups directly proportional to its degree of polymerization. Each pair of these hydroxyl groups will combine with an aldehyde radical, and the formation of such acetal resins is well known. Since polyvinyl alcohol is derived chiefly from polymerized vinyl esters by hydrolysis or saponification, it has been proposed to make polyvinyl acetals by treating the polymerized vinyl esters to remove the acyl radicals which are subsequently or concurrently replaced by aldehyde groups to yield the acetal resins. This procedure has also been modified by restricting the degree of saponification or hydrolysis so that only a portion of the acyl radicals in the starting polymeric ester molecule are removed and replaced by aldehyde groups. This modified procedure results in the formation of a polymeric vinyl molecule which contains both acetal and ester groupings in its structure. The present process yields products which differ from those previously known in that they contain only acetal groups and free hydroxyl groups in their structure. Physically, the partial polyvinyl acetals are stronger, more adhesive, less thermoplastic and less readily soluble in organic solvents than are the polyvinyl esters, complete polyvinyl acetals, or polyvinyl acetal-esters.

A principal object of this invention is to provide a process for making partial polyvinyl acetal resins which is simple, efficient, and economical, and which results in products of improved purity. Another object of the invention is to provide a process for making partial polyvinyl acetals directly from polymerized vinyl esters in a single reaction step.

Any alcohol-soluble polymerized vinyl ester may form the starting material in this process. Polymerized vinyl esters of aliphatic acids, such as vinyl formate, acetate, propionate and butyrate, may be used, or, in some cases, polymerized vinyl esters of inorganic acids, such as vinyl halides, may constitute the polyvinyl body employed. The degree of polymerization of the vinyl ester started with is not restricted to any definite range, but in general polymers of high degree of molecular aggregation yield more desirable products. Polymerized vinyl acetate is a convenient starting material, and polyvinyl acetate having an average macromolecular weight in excess of about 25,000 is preferred.

The aldehydes used to form the partial polyvinyl acetals by this process may be of any type. Both aromatic and aliphatic aldehydes are useful, but the aliphatic aldehydes are preferred. Saturated aliphatic aldehydes result in products which are more desirable than the unsaturated aldehydes, and, in general, the straight-chained saturated aliphatic aldehydes containing at least three carbon atoms are most desirable. Examples of specific suitable aldehydes are benzaldehyde, formaldehyde, acetaldehyde, propionaldehyde, butyraldehyde, crotonaldehyde, 2-ethyl butyraldehyde, n-hexaldehyde, hexadienaldehyde, 2-ethyl hexaldehyde and vinyl crotonaldehyde. It is possible, of course, to make partial polyvinyl acetals in which two or more different aldehydes are combined in the same polymeric molecule. Of the foregoing, butyraldehyde has proved to be the most satisfactory in producing partial acetals of generally desirable properties.

The process is conducted by forming an alcoholic solution of the polymerized vinyl ester, and adding to this solution an amount of aldehyde insufficient to combine, under the reaction conditions of the present process, with all of the hydroxyl groups equivalent to the acyl groups of the polyvinyl ester. A small quantity of mineral acid is also added to the solution, and this acid acts both as a catalyst to induce the alcoholysis of the polyvinyl ester, and as a catalyst to promote the acetal-forming reaction. The reaction of aldehyde with the product of alcoholysis proceeds simultaneously with the alcoholysis, and no alcohol-insoluble intermediate product separates out as would be the case if polyvinyl alcohol were formed at any stage of the reaction. The partial polyvinyl acetal resin may precipitate out as a finished product but, under the preferred conditions it remains dissolved in the alcohol, and it may be precipitated from this solution by the addition of water. After precipitation it can be washed free of the acid catalyst, and treated as desired to purify the product.

The alcoholysis of the polyvinyl ester is complete, or substantially so, and the product of reaction contains virtually no combined acyl groups. In order to insure total freedom from acyl groups in the product, and to neutralize completely any remaining traces of mineral acid I prefer to treat the partial polyvinyl acetal with alkali, for example, alcoholic sodium hydroxide, in slight excess.

Suitable acids for use as catalysts in the process may be hydrochloric acid, sulfuric acid or practically any strong inorganic acid or acidic substance. Anhydrous hydrogen chloride and sulfuric acid which is anhydrous, or virtually so, are preferred catalysts.

The process may be operated at any convenient temperature. In general, less discoloration of the product occurs, and yet practical reaction speeds may be obtained at relatively low temperatures, for example, from about 25° to 60° C.

The alcohol used as the solvent medium may be any of the lower aliphatic alcohols. Methyl, ethyl, isopropyl or butyl alcohols all are useful, but since it is preferred to operate the process with the entire system initially anhydrous, or substantially free from water, methyl alcohol is a highly desirable reaction medium because it is readily available in anhydrous form.

The partial polyvinyl acetal resins which are obtained by this process may contain any proportion of free hydroxyl and combined acetal groups. In general it has been found that those products are most useful in which from about 25% to about 80% of the hydroxyl groups in the macromolecule are combined with aldehyde to form acetal groups, and, specifically, the partial polyvinyl acetals in which about 60% to about 75% of the hydroxyl groups are combined with aldehyde are most desirable. These products are useful wherever resinous plastics having good adhesion, strength, toughness, flexibility, and moderate thermoplasticity are desired. In particular, they are very valuable as adhesive reinforcing layers in laminated nonshattering glass.

The process of this invention will be illustrated by the following examples of its operation:

*Example I*

Thirty-seven parts by weight of polymerized vinyl acetate having an average macromolecular weight of about 27,000 were dissolved in 228 parts by weight of anhydrous methyl alcohol in a glass-lined reaction vessel equipped with a stirring device. When the polymerized vinyl acetate was completely dissolved, 16.8 parts by weight of freshly distilled anhydrous n-butyraldehyde and 5.3 parts by weight of dry hydrogen chloride dissolved in 12.4 parts by weight of anhydrous methyl alcohol were slowly poured into the reaction vessel with constant stirring. The agitation was continued, and the reaction mixture was maintained at a temperature of 30° C. for 40 hours. At the end of this time the partial polyvinyl acetal resin was precipitated from its solution in the methyl alcohol by means of distilled water, washed thoroughly and redissolved in methyl alcohol. This solution was then neutralized with alcoholic sodium hydroxide, and the resin was again precipitated by means of water and dried. The dry resin was finally purified by again dissolving it in methyl alcohol and filter-pressing this solution. The partial polyvinyl acetal resin was thereafter precipitated from the filtered solution, and dried.

*Example II*

Thirty-four parts by weight of polymerized vinyl acetate of the type described in Example I were dissolved in 210 parts by weight of anhydrous methyl alcohol in a glass-lined reaction vessel equipped with a stirrer. After solution was complete, 15 parts by weight of freshly distilled anhydrous n-butyraldehyde and 14 parts by weight of concentrated sulfuric acid dissolved in 14 parts by weight of anhydrous methyl alcohol were poured slowly into the reaction vessel with constant stirring. This mixture was maintained at a temperature of 45° C. with continuous agitation for 40 hours. At the end of this time, the partial polyvinyl acetal resin was precipitated from its solution in methyl alcohol by means of distilled water, and was purified as described in Example I.

*Example III*

Thirty-one parts by weight of polymerized vinyl acetate as described in Example I were dissolved in 220 parts by weight of anhydrous methyl alcohol in a glass-lined reaction vessel provided with a stirring device. After solution was complete, 10.4 parts by weight of freshly distilled anhydrous n-butyraldehyde and 4.4 parts by weight of dry hydrogen chloride dissolved in 10 parts by weight of anhydrous methyl alcohol were added slowly to the reaction vessel with constant stirring. This mixture was continuously agitated for 60 hours at 30° C., and at the end of this time the partial polyvinyl acetal resin was precipitated from the reaction mixture by means of distilled water. The precipitated resin was purified by the treatment described in Example I.

*Example IV*

Thirty parts by weight of polymerized vinyl acetate of the type described in Example I were dissolved in 112 parts by weight of anhydrous methyl alcohol in a glass-lined reaction vessel provided with an agitator. To this solution were added slowly 12 parts by weight of freshly distilled anhydrous n-butyraldehyde and 7 parts by weight of concentrated sulfuric acid dissolved in a small quantity of anhydrous methyl alcohol. Agitation of the reaction mixture was continued throughout the addition of these materials and for a further period of 42 hours. The temperature throughout the reaction was maintained at about 45° C. The partial polyvinyl acetal resulting from this reaction was precipitated from its solution in the methyl alcohol by the addition of distilled water. The precipitated resin was thereafter treated and purified as described in the preceding examples.

The partial polyvinyl acetal resins obtained in the foregoing examples are characterized by their solubility in methyl and ethyl alcohols, and by their lack of solubility in hydrocarbons, such as benzene and toluene, or chlorinated hydrocarbons, such as chloroform and methylene chloride. These products are also soluble in glycol monoalkyl ethers, and in mixtures of water with methyl alcohol which contain less than 10% of water. The partial polyvinyl acetal resins are characterized by partial compatibility with ester-type plasticizers, such as diethyl phthalate and the like, but apparently are not actually dissolved in the cold by these esters.

The quantity of catalyst required for use in carrying out the process of this invention may vary from about 5% to 50% of the weight of polymerized vinyl ester used, and in general at least about 10% is desirable to maintain adequate reaction velocities.

Modifications of the process are possible and are included within the scope of the invention as defined by the appended claims.

I claim:

1. Process for making partial polyvinyl acetal resins which comprises treating an alcoholic solution of a polyvinyl ester with an inorganic acid to cause complete alcoholysis of said ester and simultaneously causing to react therewith an amount of aldehyde less than that equivalent to the total polyvinyl product of alcoholysis, the entire system being initially free from water with the reaction carried out in the presence of at least a major part of the water formed during the reaction, said reaction being maintained at a temperature below boiling and below about 60° C., and thereafter treating the reaction product with an alkali.

2. Process for making partial polyvinyl acetal resins which comprises treating an alcoholic solution of a polyvinyl ester with an inorganic acid to cause complete alcoholysis of said ester and simultaneously causing a saturated aliphatic aldehyde to react therewith in an amount whereby from about 25% to about 80% of the hydroxyl groups of the polyvinyl product of alcoholysis are combined with aldehyde, the entire system being initially free from water with the reaction carried out in the presence of at least a major part of the water formed during the reaction, said reaction being maintained at a temperature below boiling and below about 60° C., and thereafter treating the reaction product with an alkali.

3. Process for making partial polyvinyl acetal resins which comprises treating an alcoholic solution of a polyvinyl ester with an inorganic acid to cause complete alcoholysis of said ester and simultaneously causing to react therewith a saturated straight-chain aliphatic aldehyde containing at least three carbon atoms in an amount whereby from about 25% to about 80% of the hydroxyl groups of the polyvinyl product of alcoholysis are combined with aldehyde, the entire system being initially free from water with the reaction carried out in the presence of at least a major part of the water formed during the reaction, said reaction being maintained at a temperature below boiling and below about 60° C., and thereafter treating the reaction product with an alkali.

4. Process for making partial polyvinyl acetal resins which comprises treating an alcoholic solution of a polyvinyl ester with an inorganic acid to cause complete alcoholysis of said ester and simultaneously reacting butyraldehyde therewith in an amount whereby from about 25% to about 80% of the hydroxyl groups of the polyvinyl product of alcoholysis are combined with butyraldehyde, the entire system being initially free from water with the reaction carried out in the presence of at least a major part of the water formed during the reaction, said reaction being maintained at a temperature below boiling and below about 60° C., and thereafter treating the reaction product with an alkali.

5. Process for making partial polyvinyl acetal resins which comprises treating an alcoholic solution of a polyvinyl ester with an inorganic acid to cause complete alcoholysis of said ester and simultaneously reacting butyraldehyde with the polyvinyl product of alcoholysis in an amount whereby from about 60% to about 75% of the hydroxyl groups of said polyvinyl product of alcoholysis are combined with butyraldehyde, the entire system being initially free from water with the reaction carried out in the presence of at least a major part of the water formed during the reaction, said reaction being maintained at a temperature between about 30° and about 45° C. and below boiling, and thereafter treating the reaction product with an alkali.

6. Process for making partial polyvinyl acetal resins which comprises treating a solution of highly polymerized vinyl acetate in methyl alcohol with an inorganic acid to cause complete alcoholysis of the polyvinyl acetate and simultaneously causing to react therewith an amount of butyraldehyde whereby from about 60% to about 75% of the hydroxyl groups of product of alcoholysis are combined with butyraldehyde, the entire system being initially free from water, with the reaction carried out in the presence of at least a major part of the water formed during the reaction, said reaction being maintained at a temperature between about 30° and about 45° C. and below boiling, and thereafter treating the reaction product with an alkali.

GRANVILLE A. PERKINS.